June 9, 1942.  S. C. EWING  2,285,917

CONTROL SYSTEM FOR SYNCHRONOUS MOTORS

Filed June 20, 1941

Inventor:
Samuel C. Ewing,
by Harry E. Dunham
His Attorney.

Patented June 9, 1942

2,285,917

UNITED STATES PATENT OFFICE 2,285,917

CONTROL SYSTEM FOR SYNCHRONOUS MOTORS

Samuel C. Ewing, Scotia, N. Y., assignor to General Electric Company, a corporation of New York Application June 20, 1941, Serial No. 398,890

8 Claims. (Cl. 172—289)

My invention relates to control systems for synchronous motors and particularly to control systems for automatically removing the field excitation from a synchronous motor when it is pulled out of step and for subsequently re-establishing the field excitation to resynchronize the motor.

One object of my invention is to provide an improved arrangement for preventing the windings of a synchronous motor from being damaged due to the failure of the motor to resynchronize within a predetermined time after being pulled out of step.

In accordance with my invention, I provide an arrangement of apparatus for limiting the number of times that the automatic control apparatus can attempt to resynchronize the motor after it has been pulled out of step.

Figure 1:
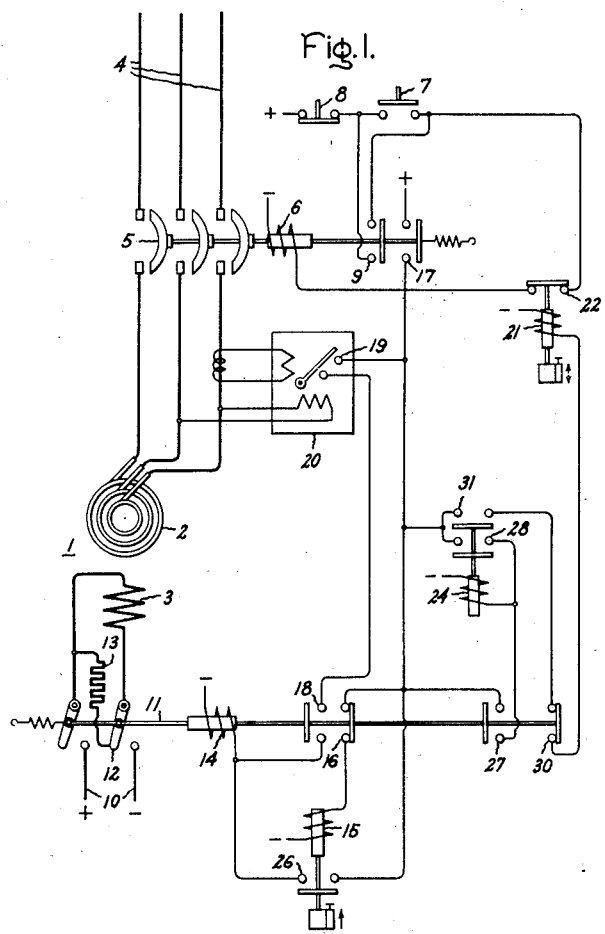
Figure 2:
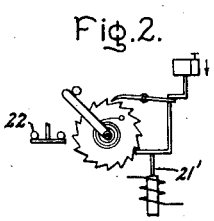

My invention will be better understood from the following description when taken in connection with the accompanying drawing, Fig. 1 of which diagrammatically illustrates a synchronous motor control system embodying my invention, and Fig. 2 of which diagrammatically illustrates a modification of a portion of the system shown in Fig. 1, and the scope of my invention will be pointed out in the appended claims.

Referring to Fig. 1 of the drawing, I represents a synchronous motor having an armature winding 2 and a field winding 3. In order to simplify the disclosure, I have shown my invention in connection with a full voltage starting system whereby the synchronous motor is started as an induction motor by connecting the motor armature winding directly to an alternating current supply circuit while the field winding of the motor is short-circuited through a suitable resistor. It is to be understood, however, that my invention is not limited to any particular arrangement for starting the motor. As shown in the drawing, the armature winding 2 is arranged to be connected directly to the alternating current supply circuit 4 by means of a suitable switch 5 having a closing coil 6 which is arranged to be connected across a suitable control circuit when a control switch 7 is closed. As shown in the drawing, the control switch 7 is a manually operated switch, but it will be obvious to those skilled in the art that it may be automatically controlled in any suitable manner so that it is closed whenever it is desired to start the motor. In the circuit of the closing coil 6, I also provide the normally closed contacts of a switch 8, which may be controlled in any suitable manner, so that it is opened when it is desired to stop the motor from a remote control point. The switch 5, when closed, completes through its auxiliary contacts 9 a locking circuit for the closing coil 6 so that the starting switch 7 may be opened without effecting the opening of the switch 5.

The field winding 3 of the motor 1 is arranged to be connected to a suitable source of excitation 10 by means of a field switch 11 when it is closed. When the field switch 11 is open, its auxiliary contacts 12 connect a suitable discharge resistor 13 across the terminals of the field winding 3. The field switch 11 is provided with an operating coil 14 which, when energized, moves the switch from its open position to its closed position. The energization of the closing coil 14 is effected by means of a time relay 15 whenever the switch 5 is closed and the field switch 11 is open. This result is accomplished by having the energizing circuit of the time relay 15 include the auxiliary contacts 16 of the field switch 11 and the contacts 17 of the switch 5. When the field switch 11 is in its closed position, its auxiliary contacts 18 control a shunt circuit around the contacts 26 of the time relay 15 so that the closing coil 14 is not deenergized due to the deenergization of the time relay 15 which is effected by the field switch 11 moving to its closed position.

In series with the contacts 26 of the relay 15 which are in the shunt circuit around the contacts of the time relay 15, I also provide the contacts 19 of a suitable out-of-step responsive relay 20 shown as a power-factor relay, the windings of which are connected to the armature circuit of the motor 1 in any suitable manner, examples of which are well known in the art, so that, as long as the power-factor of the motor is above a predetermined lagging value, the relay 20 maintains its contacts 19 closed.

In order to limit the number of times the field switch 11 can be reclosed when the motor is pulled out of step, I also provide in the energizing circuit of the closing coil 6 the contacts 22 of a time relay 21 which is arranged to be energized each time the field switch 11 is opened while the switch 5 is closed. This time relay 21 is designed in any suitable manner so that it will open its contacts 22 when the relay is energized for a predetermined time interval a predetermined number of times with less than a predetermined time interval between any two successive energizations thereof. In the particular arrangement shown in Fig. 1, an energizing circuit for the time relay 21 is completed by the opening of the field switch 11, if at the same time a relay 24 is energized. The relay 24 is arranged to be energized in response to the first closure of the field switch 11, and when energized, completes a locking circuit for itself which remains completed as long as the closing coil 6 of the switch 5 is energized.

The operation of the embodiment of my invention shown in Fig. 1 is as follows:

When it is desired to start the motor 1, the control switch 7 is closed to complete through the contacts of the control switch 8 and the contacts 22 of the time relay 21 an energizing circuit for the closing coil 6 of the switch 5. The closing of the switch 5 connects the armature winding 2 of the motor 1 directly across the alternating current supply circuit 4 so that the motor starts and accelerates as an induction motor. The closing of the auxiliary contacts 9 on the switch 5 completes a shunt circuit around the contacts of the control switch 7 so that this control switch may be opened without effecting the deenergization of the closing coil 6.

During the starting operation of the motor 1, a circuit is completed for the motor field winding 3 through the discharge resistor 13 and the auxiliary contacts 12 of the field switch 11.

The closing of the auxiliary contacts 17 on the switch 5 completes through the auxiliary contacts 16 of the field switch 11 an energizing circuit for the time relay 15 which, after being energized for a predetermined length of time that is long enough to allow the motor to accelerate to approximately its synchronous speed, closes its contacts 26 and completes an energizing circuit for the closing coil 14 of the field switch 11 through the contacts 17 of the switch 5. The closing of the field switch 11 connects the field winding 3 to the source of excitation 10 so that the motor 1 pulls into synchronism. The closing of the auxiliary contacts 18 of the field switch 11 completes through the contacts 19 of the power-factor relay 20 a shunt circuit around the contacts 26 of the time relay 15 so that the subsequent opening of the contacts 26 does not deenergize the closing coil 14 of the field switch 11. The contact 26 of the relay 15 opens in a predetermined time interval after the coil of relay 15 is deenergized by the contact 16 of the field switch 11. This is to allow the motor 1 to reach a steady state condition after the field switch 11 is initially closed. The closing of the auxiliary contacts 27 of the field switch 11 completes an energizing circuit for the control relay 24 through the auxiliary contacts 17 of the switch 5. By closing its contacts 28, the relay 24 completes a shunt circuit around the contacts 27 of the field switch 11 so that the subsequent opening of the field switch 11 while the switch 5 is closed does not deenergize the control relay 24.

As long as the motor 1 remains in synchronism, the power-factor of the motor armature circuit is such that the power-factor relay 20 maintains its contacts 19 closed. When, however, the motor is pulled out of synchronism, the power-factor of the motor armature circuit becomes sufficiently lagging to cause the power-factor relay 20 to open its contacts 19 and thereby interrupt the energizing circuit of the closing coil 14 of the field switch 11. The field switch 11 immediately moves to its open position, thereby disconnecting the field winding 3 from the source of excitation 10 and reconnecting the discharge resistor 13 across the terminals of the field winding 3. By closing its contacts 16, the field switch 11 again completes an energizing circuit for the time relay 15, and by closing its contacts 30, completes an energizing circuit for the time relay 21 through the contacts 31 of the control relay 24 and the contacts 17 of the switch 15. Both of the time relays 15 and 21 start their timing operations, but since the operating time of the time relay 21 is much longer than the operating time of the time relay 15, the latter will close its contacts 26 and effect, in the manner heretofore described, the closing of the field switch 11 before the timing relay 21 can effect the opening of contacts 22. The reclosing of the field switch 11 again causes the motor to pull into step, and if it remains in synchronism after the first reclosure of the field switch 11, the circuit of the time relay 21 will remain open at the contacts 30 for a sufficient length of time to allow the time relay 21 to be restored to its normal position. However, if the motor is still overloaded so that it is again pulled out of step as soon as the field switch 11 is reclosed, the power-factor relay 20 again opens its contacts 19 and effects the opening of the field switch 11 in the manner heretofore described so that the time relays 15 and 21 are reenergized. After the field switch 11 is opened for a predetermined time, the time relay 15 again effects the closing thereof. In this manner, the field switch 11 is intermittently reclosed in an attempt to resynchronize the motor 1 until either the motor remains in synchronism or the time relay 21 is energized for a sufficient length of time to open its contacts 22. If the motor 1 remains in synchronism after any reclosure of the field switch 11, the time relay 22 is deenergized for a sufficient length of time to allow it to be restored to its normal position. If, however, a sufficient number of openings of the field switch 11 occur to cause the relay 21 to open its contacts 22, the circuit of the closing coil 6 of the switch 5 is opened so that the motor armature winding 2 is disconnected from the supply circuit 4, thereby causing the motor to be shut down. Instead of using a time relay 21 of the type diagrammatically shown in Fig. 1, a notching relay 21' of the type diagrammatically shown in Fig. 2 may be used to open the contacts 22 in the energizing circuit of the closing coil 6 when the field switch 11 is opened a predetermined number of times within a predetermined time interval.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current circuit, a source of direct current, a synchronous motor having its armature winding connected to said alternating current circuit and its field winding connected to said source, means for disconnecting said field winding from said source when said motor falls out of step and subsequently reconnecting said field winding to said source, and means responsive to a predetermined number of disconnections of said field winding from said source for effecting the disconnection of said armature winding from said circuit.

2. In combination, an alternating current circuit, a source of direct current, a synchronous motor having its armature winding connected to said alternating current circuit and its field winding connected to said source, means for disconnecting said field winding from said source when said motor falls out of step and subsequently reconnecting said field winding to said source while said armature winding remains connected to said circuit, and means responsive to a predetermined number of disconnections of said field winding from said source for effecting the disconnection of said armature winding from said circuit.

3. In combination, an alternating current circuit, a source of direct current, a synchronous motor having its armature winding connected to said alternating current circuit and its field winding connected to said source, means for disconnecting said field winding from said source when said motor falls out of step and subsequently reconnecting said field winding to said source while said armature winding remains connected to said circuit, and means responsive to a predetermined number of disconnections of said field winding from said source within a predetermined time interval for effecting the disconnection of said armature winding from said circuit.

4. In combination, an alternating current circuit, a source of direct current, a synchronous motor having its armature winding connected to said alternating current circuit and its field winding connected to said source, means for disconnecting said field winding from said source when said motor falls out of step and subsequently reconnecting said field winding to said source, a control device, means for actuating said device in response to each disconnection of said field winding from said source, and means responsive to a predetermined number of actuations of said device for disconnecting said armature winding from said circuit.

5. In combination, an alternating current circuit, a source of direct current, a synchronous motor having its armature winding connected to said alternating current circuit and its field winding connected to said source, means for disconnecting said field winding from said source when said motor falls out of step and subsequently reconnecting said field winding to said source, a control device, means for actuating said device in response to each disconnection of said field winding from said source, and means responsive to a predetermined number of actuations of said device within a predetermined time interval for disconnecting said armature winding from said circuit.

6. In combination, an alternating current circuit, a synchronous motor having its armature winding connected to said circuit, means for decreasing the field excitation of said motor when it falls out of step and for subsequently increasing the field excitation to resynchronize the motor, and means responsive to a predetermined number of changes in the excitation of said motor for disconnecting said armature winding from said circuit.

7. In combination, an alternating current circuit, a synchronous motor having its armature winding connected to said circuit, means for decreasing the field excitation of said motor when it falls out of step and for subsequently increasing the field excitation to resynchronize the motor, and means responsive to a predetermined number of changes in the excitation of said motor within a predetermined time interval for disconnecting said armature winding from said circuit.

8. In combination, an alternating current circuit, a synchronous motor having an armature winding and a field winding, a source of excitation, a field switch for connecting said source to said field winding, means for connecting said armature winding to said circuit and for subsequently closing said field switch, a relay responsive to the closing of said field switch, means for opening and subsequently reclosing said field switch when said motor falls out of step, and means controlled by said relay and a predetermined number of operations of said field switch for disconnecting said armature winding from said circuit.

SAMUEL C. EWING.